May 8, 1956     P. H. FERRIER     2,744,765
WHEEL SUSPENSION HAVING COIL SPRINGS AND DUAL AXLE
Filed Dec. 6, 1954     2 Sheets-Sheet 1
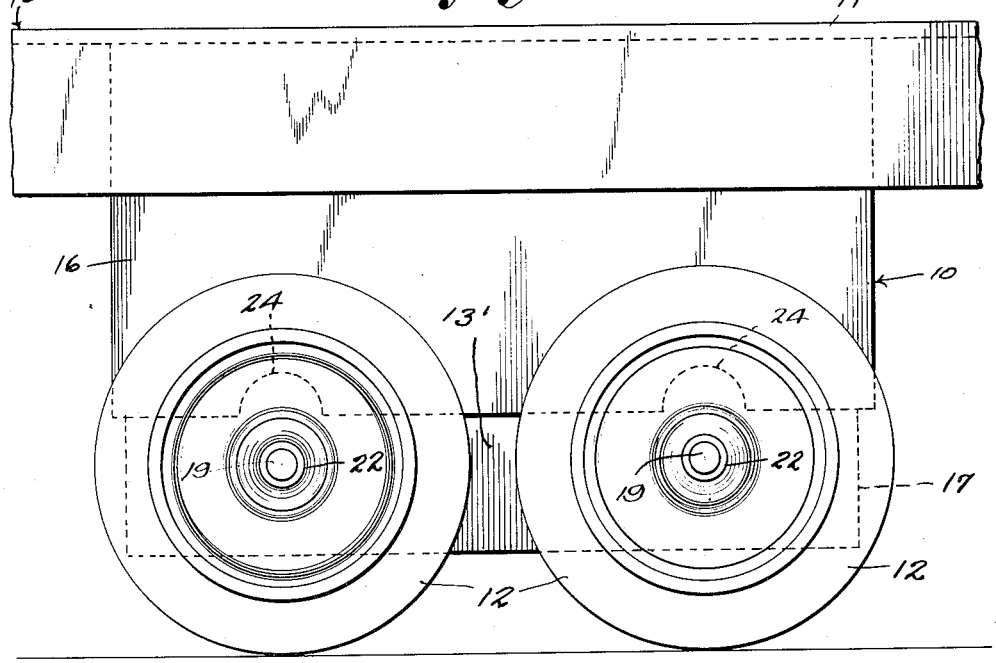
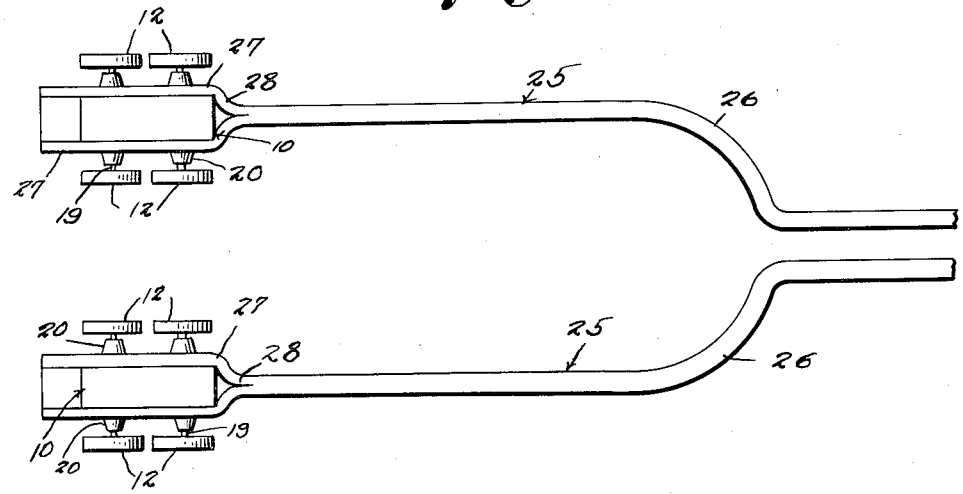
P. H. Ferrier
INVENTOR
BY C. A. Snow & Co.
ATTORNEYS.

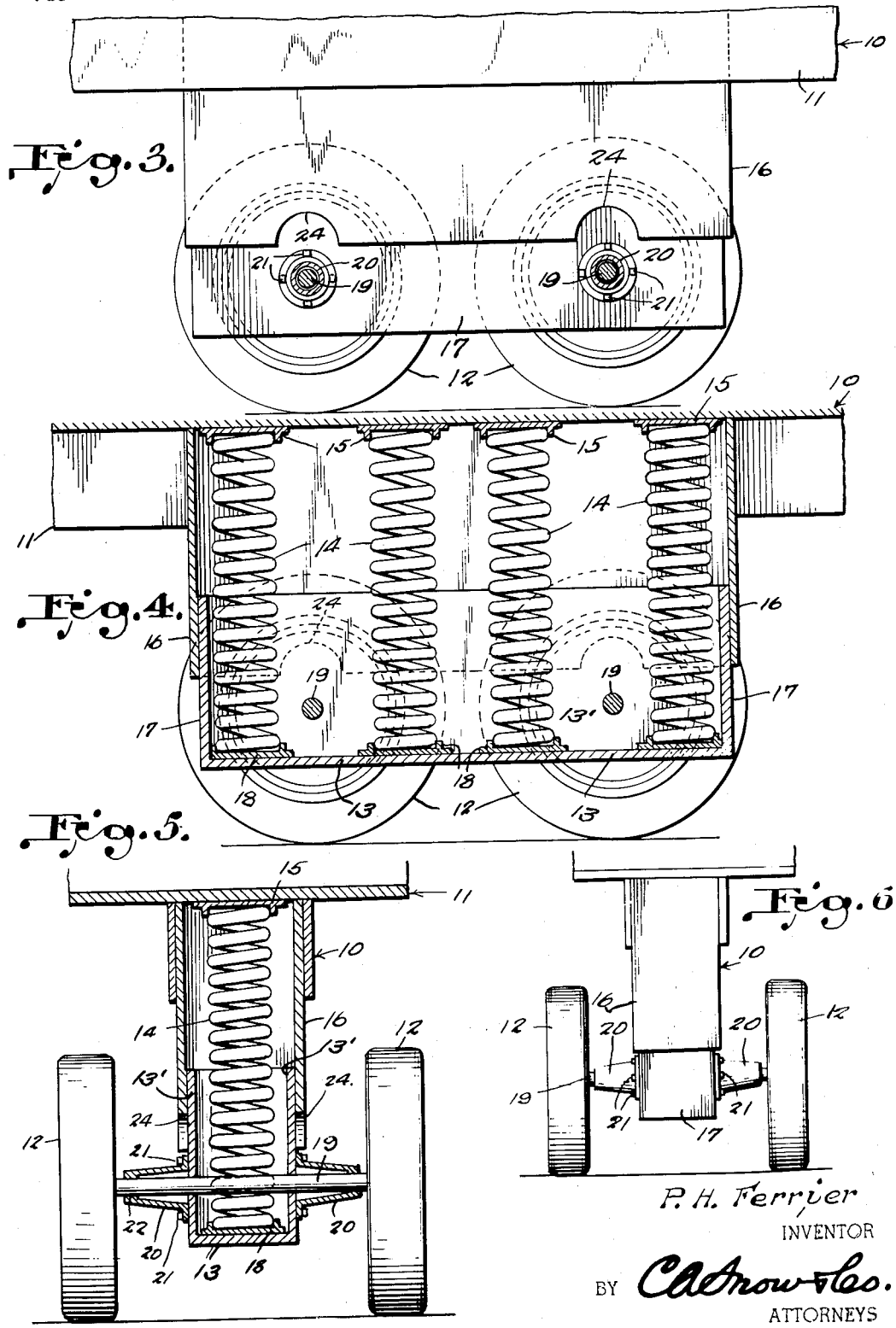

2,744,765

WHEEL SUSPENSION HAVING COIL SPRINGS AND DUAL AXLE

Peter H. Ferrier, Brookfield, Ill.

Application December 6, 1954, Serial No. 473,100

1 Claim. (Cl. 280—124)

This invention relates to wheel suspension for the axles of a mobile conveyance as trucks and trailers or the like.

It is a primary object of this invention to provide a wheel suspension of the kind to be more particularly described hereinafter which is relatively easy for manufacture and assembly on a wheeled conveyance to prevent further addition of the height of the conveyance. The overlying structure and arrangement of this novel spring suspension lends itself to the underlying, or underslung, arrangement of wheels thereby preventing the tipping over of the conveyance on which this novel spring suspension means is applied.

Another object of this invention is to provide a novel spring suspension between the wheels and axles of a wheeled conveyance and the frame of the conveyance on which the wheels are applied, the spring suspension including a pair of telescopically related spring covers one of which is secured to the frame and the other to the axle covers for the wheels therefor.

Other and further objects and advantages of the invention will be hereinafter described and the novel features thereof defined in the appended claim.

In the drawings:

Fig. 1 is a side elevation of the wheel suspension device constructed according to an embodiment of my invention applied to a conveyance frame therefore, the frame being partly broken away.

Fig. 2 is a top plan view of a pair of my spring suspension devices with a towing yoke applied thereto.

Fig. 3 is a side elevation, partly broken away and partly in section, of my spring suspension as applied to a conveyance.

Fig. 4 is a longitudinal vertical section of my spring suspension means.

Fig. 5 is a transverse section, and,

Fig. 6 is an end elevational view.

Heretofore considerable difficulty has been noted in the suspension of the wheels below a vehicle, whether the vehicle is an industrial truck or any other wheeled conveyance, and it is with this idea in mind that the invention, constructed according to an embodiment of my invention, is designed. With this spring suspension means the springs between the wheels and the frame of the object may be underslung relative to the vehicle using this spring suspension means. Also by this spring suspension means the vibration of the vehicle and the undulation thereof will be prevented while the vehicle, or conveyance, is resiliently supported on its wheels.

Referring now more particularly to the drawings the numeral 10 designates generally a spring suspension device constructed according to an embodiment of my invention.

The frame of the body is designated generally by the reference numeral 11 with the wheels therefor positioned below the frame in such a manner as to prevent the vibration and undulation of the body and frame 11.

The wheels 12 are supported below the frame of the body by a plurality of coil springs 14 which will accomplish the above noted result.

The frame cooperates with the coil springs and wheels, there being an upper spring bearing cup 15 formed onto the frame 11 for the reception therein of the upper ends of the coil springs 14 as clearly noted in Figs. 4 and 5 of the drawings.

There is a depending upper casing 16 for the coil spring, or resilient means, this casing being opened at the lower end thereof so that the upper open ended casing is opened on the lower side thereof for the reception therein of the lower telescopic casing 17, open at the upper end, against the tension of the coil springs 14. A lower spring bearing cup 18 is provided at the lower end of the lower telescopic casing 17, or bottom wall 13, as clearly noted in Figs. 5 and 4 of the drawings, whereby the coil spring will continually urge the lower casing 17 downwardly and outwardly from the frame 11 or body. The bottom 13 and upstanding side walls 13' rising from said bottom comprise the entire lower casing 17 which encloses all of the springs 14 of the wheel truck as shown in the attached drawings.

An axle 19 is positioned transversely of the lower casing 17, the axle 19 having a pair of outwardly extending axle covers 20 thereon adjacent the outer ends thereof and extending outwardly from the lower telescopic and lower casing 17 as clearly shown in Figs. 5 and 6 of the drawings.

The axle cover 20 is secured to the lower casing 17 by bolts 21 or other suitable fastening means wherein the axle 19 is secured with the wheels 12 rotatable on the outer end of the axles. There is an axle bearing 22 adjacent the outer ends of the axles 19 within the outer ends of the axle covers 20.

The lower edge of the upper telescopic casing 16 is provided with spaced apart concave cutout portions 24 for receiving therein the axle covers 20 as the lower telescopic casing 17 is moved upwardly relative to the upper telescopic casing 16 and frame 11 by any cause for the vertical movement of the wheel or wheels 12.

This structure of the spring suspension means will provide for the vertical movement of the wheels relative to the frame together with the vertical movement of the lower casing relative to the upper casing to thereby avoid any vibration for the frame or undulation therefore upon the traversing of the frame, so constructed and arranged, to accomplish the results of this wheel suspension means.

In order to move the wheeled conveyance from one place to another I have provided a frame 25 to be engaged with each of the spring suspension devices 10, this yoke including a longitudinally extending towing arm 26 with a U-shaped connecting arm 27 at one end thereof for engagement with the outer sides of the spring suspension devices, the U-shaped arm 27 being formed as a split portion of the towing arm 26 to be engaged about the sides of the spring suspension device, the towing arm 26 being formed integral with the bight 28 which provides the connecting arms 27 engageable on the opposite sides of the spring suspension device described above. The underslung principle of this spring suspension will evenly apply the weight of the frame being supported, below the wheel axles regardless of the wide spread apart distribution of the load borne by the road.

While the specific details of one embodiment of this invention have been herein shown and described, the invention is not confined thereto as changes and alterations may be made without departing from the spirit and scope thereof as defined in the appended claim.

I claim:

A wheel suspension device comprising an upper casing, a lower casing telescoping and slidable in said upper casing, confronting cup-shaped spring seats carried by said upper and lower casings, a plurality of vertically disposed coil springs seated at the opposite ends thereof in said seats, oppositely extending pairs of cone-shaped axle housings fixed to the opposite sides of said lower casing, axle bearings in the outer ends of said housings, an axle rotatably extending through each pair of housings and bearings, and wheels on the outer ends of each axle.

References Cited in the file of this patent

UNITED STATES PATENTS

| | | |
|---|---|---|
| 873,221 | Edwards | Dec. 10, 1907 |
| 1,022,228 | Edwards | Apr. 2, 1912 |
| 1,259,912 | Seidenbecker | Mar. 19, 1918 |